Patented Oct. 25, 1949

2,485,603

UNITED STATES PATENT OFFICE 2,485,603

HYDROCARBOSILICON THIOCYANATES AND ARTICLES TREATED THEREWITH

Robert M. Joyce, Jr., Wilmington, Del., assignor to E. I. du Pont de Nemours & Company, Wilmington, Del., a corporation of Delaware No Drawing. Application May 21, 1946, Serial No. 671,388

16 Claims. (Cl. 117—143)

This invention relates to organic compounds of silicon and to methods for their preparation. More particularly this invention relates to new organosilicon compounds having a carbon-silicon bond, to a process for their preparation and to articles coated with such new compounds.

It is known that the organosilicon chlorides, particularly those in which an organic radical is attached to silicon through a carbon-silicon bond, have the property of conferring water repellency to textiles, glass, ceramics and the like. However, in the process of making substances water repellent, these organosilicon chlorides undergo hydrolysis with the liberation of hydrochloric acid. Inasmuch as hydrochloric acid has a pronounced tendering effect on cellulose and is capable of attacking many types of ceramics, the applicability of these organosilicon chlorides is quite limited. For example, they cannot be used for the treatment of cotton fabrics because of the severity of the hydrogen chloride tendering.

It is an object of this invention to provide a new class of organosilicon compounds and a method for their preparation. A further object of this invention is to provide a new class of organosilicon compounds, which upon hydrolysis do not liberate a cotton-tendering acid. A still further object is to provide new organosilicon compounds having a carbon-silicon bond. Another object is to provide water repellent articles in which the water repellency is conferred by these new organosilicon compounds. Other objects will appear hereinafter.

These objects are accomplished by new organosilicon thiocyanates having the general formula $R_nSi(SCN)_{4-n}$ wherein R is a monovalent hydrocarbon radical and $n$ is an integer having a value of 1, 2 or 3. These organosilicon thiocyanates thus are hydrocarbosilicon thiocyanates containing a monovalent hydrocarbon radical joined to the silicon by a carbon-silicon bond. The hydrocarbon radicals can be saturated or unsaturated radicals, such as alkyl, alkenyl, aryl, aralkyl and cycloalkyl. The alkylsilicon thiocyanantes are preferred for the purpose of imparting water repellency to textiles and ceramics. Particularly effective are the dialkylsilicon dithiocyanates, for which $n$ in the above formula has the value 2.

The new organosilicon compounds of this invention can be made by reacting an inorganic salt of thiocyanic acid with a hydrocarbosilicon halide having the general formula $R_nSiX_{4-n}$ wherein R is an organic radical selected from the class consisting of alkyl, alkenyl, aryl, aralkyl and cycloalkyl hydrocarbon radicals, X is halogen, and $n$ is an integer having a value from 1 to 3 inclusive. These organosilicon halides are thus hydrocarbosilicon halides. In the preparation of these new organic thiocyanates, various hydrocarbosilicon halides can be employed, but the chlorides are most generally used since they are inexpensive and readily available. However, other halides, such as hydrocarbosilicon fluorides and bromides, can be used if desired.

The preparation of these new organosilicon thiocyanates can be carried out by reacting the corresponding hydrocarbosilicon halides with an inorganic thiocyanate. For example, an alkylsilicon thiocyanate is prepared by reacting an inorganic thiocyanate, such as lead thiocyanate, with an alkylsilicon halide, such as dimethylsilicon dichloride. Especially preferred are the heavy metal salts of thiocyanic acid, such as those of silver, lead, mercury, copper or zinc.

A preferred method of conveniently producing the new organosilicon thiocyanates of this invention is by mixing the hydrocarbosilicon halide, such as a dialkylsilicon dichloride, with an excess of the inorganic thiocyanate, such as lead thiocyanate, in an anhydrous organic solvent, such as benzene, heating the mixture at reflux temperature, followed by filtration of the lead salts and distillation of the reaction products. The reaction temperature can be varied between 25° and 200° C., depending on the particular hydrocarbosilicon halide and particular organic solvent employed, and is preferably maintained at between 50° and 125° C. Many of the organosilicon thiocyanates which are the subject of this invention can be isolated and purified by distillation. In other cases, high boiling solid compounds are formed and these can be isolated and purified by recrystallization from suitable inert non-hydroxylic solvents.

The reaction can be carried out without a diluent, particularly in those cases where the organosilicon halide is a liquid. In such cases the reaction can be carried out at temperatures ranging from 50° C. to 125° C. However, it is preferred to employ an inert diluent for this purpose. Particularly useful in this connection are hydrocarbon solvents, such as benzene, toluene, octane and the like. Other solvents which can be employed include ethers and ketones.

Articles treated or impregnated with the new organosilicon thiocyanates of this invention are rendered water repellent. The articles can be treated with the organosilicon thiocyanate from solution or by any other available method. After treatment with the organosilicon thiocyanate, the article is dried and may be heat treated, preferably at a temperature of 125° to 175° C. for a short period of time, such as 5 minutes. Application of the organosilicon thiocyanate to fabrics imparts water repellency thereto without tendering the fabric.

This invention is further illustrated by the following examples, in which the amounts are stated in parts by weight, unless otherwise specified.

Example I

A mixture comprising 50 parts of dimethylsilicon dichloride and 25 parts of methylsilicon trichloride is dissolved in 250 parts of anhydrous benzene. This solution is stirred and heated at reflux temperature while four 46-part portions of powdered lead thiocyanate are added at one-half hour intervals. The mixture is refluxed and stirred for an additional three hours, then cooled, filtered to separate the lead salts, and subjected to distillation in a nitrogen atmosphere. After removal of the benzene there is obtained 37 parts of dimethylsilicon dithiocyanate boiling at 83–86°/9–10 mm.

Analysis: Calcd. for $C_4H_6S_2N_2Si$; Si, 16.10%; found, 15.49%.

There is also obtained 27 g. of a white crystalline solid which is methylsilicon trithiocyanate.

The application of dimethylsilicon dithiocyanate to undyed cotton sateen from solution in benzene or methyl ethyl ketone, followed by drying and heat treatment at 125° C. for 5 minutes imparts a high degree of water repellency to the fabric. Essentially no tendering of the fabric is observed as a result of this treatment.

Example II

A mixture of 25 parts of benzylsilicon trichloride, 61 parts of lead thiocyanate and 88 parts of anhydrous benzene is refluxed with stirring for six hours in a reactor protected from atmospheric moisture. The mixture is then cooled and filtered to remove the solid. The benzene is then removed by distillation under reduced pressure in a nitrogen atmosphere. There is thus obtained 32.5 parts of a yellow oil solidifying below room temperature which is a mixture of equal parts of benzylsilicon trithiocyanate and benzylsilicon monochlorodithiocyanate.

Analysis: Calcd. for $C_{10}H_7SiS_3N_3$; Si, 9.58%; S, 32.77%; Calcd. for $C_9H_7SiClS_2N_2$; Si, 10.36%; S, 23.60%; found: Si, 10.24%; S, 28.17%.

Example III

A mixture of 27 parts of phenylsilicon trichloride, 71 parts of lead thiocyanate, and 88 parts of anhydrous benzene is refluxed with stirring for five hours in a reactor protected from atmospheric moisture. The reaction mixture is filtered, decolorized with carbon black, and the solvent removed under reduced pressure in a nitrogen atmosphere. There is obtained 25 parts of a pale yellow oil solidifying below room temperature which is a mixture of about 60% phenylsilicon trithiocyanate and 40% of phenylsilicon monochlorodithiocyanate.

Analysis: Calcd. for $C_9H_5SiS_3N_3$; Si, 10.03%; S, 34.39%; Calcd. for $C_8H_5SiClS_2N_2$; Si, 10.9%; S, 24.95%; found: Si, 10.89%; S, 30.51%.

This invention is concerned with the new class of hydrocarbosilicon thiocyanates having the general formula $R_nSi(SCN)_{4-n}$ in which $n$ is an integer having a value between 0 and 4 and R is a monovalent hydrocarbon radical, that is a member selected from the class consisting of alkyl, alkenyl, aryl, aralkyl and cycloalkyl radicals. Specific examples of these types of radicals include methyl, ethyl, dodecyl, octadecyl, allyl, methallyl, undecylenyl, phenyl, tolyl, benzyl, phenylethyl, cyclohexyl, and dimethyl cyclohexyl radicals.

The new hydrocarbosilicon thiocyanates of this invention are particularly useful in imparting water repellency to such substrates as textiles, particularly cotton and rayon fabrics, to glass and to ceramics.

As many apparently widely different embodiments of this invention may be made without departing from the spirit and scope thereof, it is to be understood that I do not limit myself to the specific embodiments thereof except as defined in the appended claims.

I claim:

1. An organosilicon thiocyanate having the general formula $R_nSi(SCN)_{4-n}$ wherein R is a monovalent hydrocarbon radical and $n$ is an integer having a value from 1 to 3 inclusive.
2. An alkylsilicon thiocyanate.
3. A dialkylsilicon dithiocyanate.
4. An aralkylsilicon thiocyanate.
5. An arylsilicon thiocyanate.
6. A methylsilicon thiocyanate.
7. An article containing a water-repellent coating comprising the product formed by drying on said article an organosilicon thiocyanate having the general formula $R_nSi(SCN)_{4-n}$ wherein R is a monovalent hydrocarbon radical, and $n$ is an integer having a value from 1 to 3 inclusive.
8. An article containing a water-repellent coating comprising the product formed by drying on said article an alkylsilicon thiocyanate.
9. An article containing a water-repellent coating comprising the product formed by drying on said article an aralkylsilicon thiocyanate.
10. An article containing a water-repellent coating comprising the product formed by drying on said article an arylsilicon thiocyanate.
11. A water-repellent fabric containing a water-repellent coating comprising the product formed by heating on said fabric an organosilicon thiocyanate having the general formula $R_nSi(SCN)_{4-n}$ wherein R is a monovalent hydrocarbon radical and $n$ is an integer having a value from 1 to 3 inclusive.
12. A water-repellent fabric containing a water-repellent coating comprising the product formed by heating on said fabric an alkylsilicon thiocyanate.
13. A water-repellent fabric containing a water-repellent coating comprising the product formed by heating on said fabric a dialkylsilicon dithiocyanate.
14. Dimethylsilicon dithiocyanate.
15. Methylsilicon trithiocyanate.
16. Phenylsilicon trithiocyanate.

ROBERT M. JOYCE, Jr.

(References on following page)

REFERENCES CITED

The following references are of record in the file of this patent:

UNITED STATES PATENTS

| Number | Name | Date |
|---|---|---|
| 2,182,208 | Nason | Dec. 5, 1939 |
| 2,212,175 | Clayton et al. | Aug. 20, 1940 |
| 2,238,669 | Wiley | Apr. 15, 1941 |
| 2,253,128 | Langkammerer | Aug. 19, 1941 |
| 2,390,370 | Hyde | Dec. 4, 1945 |
| 2,404,426 | Bechtold et al. | July 23, 1946 |
| 2,405,988 | Barry | Aug. 20, 1946 |

OTHER REFERENCES

Reynolds, Jour. Chem. Soc. (London), vol. 89 (1906), pp. 397–398.

Backer et al., Recuiel der Trav. Chem., vol. 54 (1935), pp. 607–617.

Forbes et al., Jour. Amer. Chem. Soc., vol. 62 (1940), p. 761.

Anderson, Jour. Amer. Chem. Soc., vol. 64 (1942), pp. 1757–1759.

Anderson, Jour. Amer. Chem. Soc., vol. 69 (1947), pp. 3049–3051.